May 1, 1962

A. A. ZUEHLKE ETAL 3,032,732

PRESSURE-CHANGE TRANSDUCER

Filed Aug. 23, 1961

INVENTORS.
ARTHUR A. ZUEHLKE
GEORGE J. BROWN
BY

United States Patent Office 3,032,732
Patented May 1, 1962

3,032,732
PRESSURE-CHANGE TRANSDUCER
Arthur A. Zuehlke and George J. Brown, Riverside, Calif., assignors to Bourns, Inc., a corporation
Filed Aug. 23, 1961, Ser. No. 133,512
10 Claims. (Cl. 338—41)

This invention relates to instruments for translating variations in pressure of a confined fluid into corresponding electric signals or indications, and more particularly the invention relates to instruments for translating into electric signals with improved accuracy and resolution, changes in pressure that are very small compared to the total pressure range over which the instrument is effective. The term pressure, herein, is defined as the difference in force per unit area exerted by a confined fluid and the opposing force per unit area exerted by an ambient fluid and which may be substantially zero or that exerted by the ambient atmosphere.

Heretofore it has been the practice, in producing pressure-sensing and indicating instruments which were intended to register small differences or changes in pressure, to interpose motion-multiplying linkages or gearing between the pressure-sensitive cell and the indicating means, whereby relatively minute dimensional changes of the cell incident to small changes of pressure were amplified so discernible changes of the indicating means were produced. A shortcoming and serious fault of instruments of that construction is that a certain amount of lost motion or "slack" is inevitable in the motion-multiplying linkage or gearing, which causes inaccuracy in the indications as the pressure being sensed fluctuates. Also, the linkages or gearing are delicate and expensive to manufacture, especially when means for adjusting the ratio of amplification of the motion-multiplying means are provided. Further, wear of relatively moving parts over a period of operation introduces increasing errors in the indications provided by an instrument comprising such linkages.

The present invention provides an instrument that completely obviates the aforementioned disadvantages and undesirable characteristics of the prior art instruments, and provides an instrument that may be easily and inexpensively produced and which maintains its original high degree of accuracy and good resolution throughout an indefinitely long life. These desirable attributes the invention attains by utilizing between a conventional pressure-sensitive cell and an electrical transducer or indicator means, a motion-multiplying device in which no lost-motion is possible and which nevertheless is adjustable to provide any required or desired ratio of amplification of the movement provided by the cell in response to pressure-changes. The motion amplifying means comprises a set or pair of divergent resilient limbs rigidly connected adjacent their convergent ends by connecting or bridging means, the divergent end of a first one of the limbs being rigidly secured to fixed structure and the divergent end of the other or second limb being arranged to be moved generally longitudinally by direct connection with the moving part of the pressure-sensitive cell. The general arrangement is such that in response to relatively small generally longitudinal movements of the divergent end of the second limb by the cell, the two limbs are flexed or bent and the bridge structure connecting the convergent ends is generally laterally displaced in corresponding movements of relatively large extent, the latter movements being substantially pivotal movements about a slightly shifting center located between the two limbs. The bridge structure is substantially rigid and may be as long as is required to provide any desired further multiplication of the lateral or arcuate movement. The bridge structure or other means secured to it may form or carry the movable member of a pair of cooperating electrical indicator members, for example, the contact member of a potentiometer whose resistance element is arranged to be brushed or wiped by the contact as the bridge structure is moved. Thus the expansion and/or contraction movements of the cell in response to pressure-changes are amplified or multiplied by the device comprising the bridge structure and flexible limbs, and are translated into changes of resistance or potential exhibited between terminals of the potentiometer.

The preceding brief general description of the invention makes it evident that a primary object of the invention is to provide improvements in pressure transducers.

Another object is to provide an instrument for translating changes in pressure of a confined fluid, relative to a reference pressure such as that of the ambient atmosphere, into corresponding electrical indications, with improved accuracy and resolution.

Another object of the invention is to provide an improved motion-amplifier or multiplier device for pressure-indicating instruments.

Another object of the invention is to provide a sensitive pressure-transducer having a movement-multiplying means characterized by absence of lost-motion and absence of frictional wear between parts.

Other objects and advantages of the invention will hereinafter be made apparent in the appended claims and in the following description of a preferred exemplary physical instrument embodying the principles and practice of the invention, the exemplary instrument being illustrated in the accompanying drawings in which:

Figure 1:
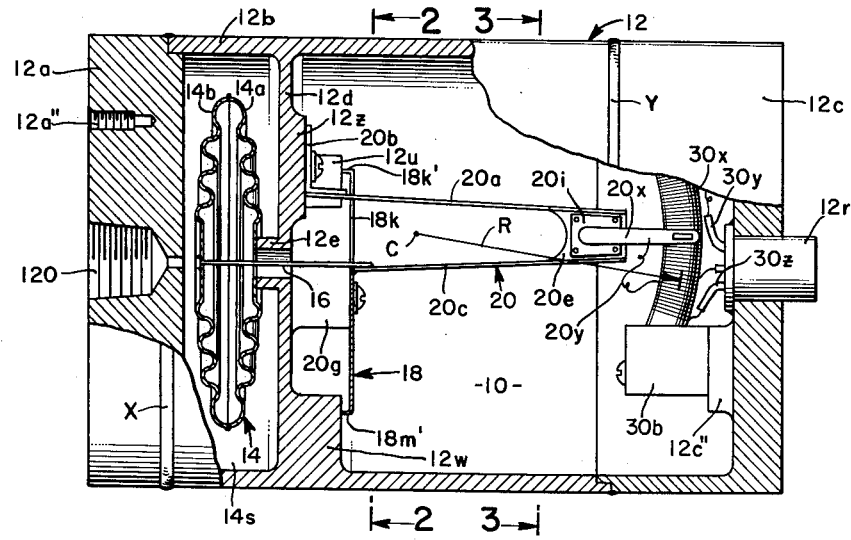
FIG. 1 is a plan view of an instrument, with portions of the body broken away to show parts in section and to show details of operating elements of the instrument, a pressure-sensitive or sensing cell being shown in section.

Referring first to FIG. 1, the instrument or transducer, indicated generally by ordinal 10, comprises operating means housed within a casing 12 formed principally of a base section 12a, an intermediate section 12b, and a cap section 12c. The three sections are secured together, preferably by brazing or welding along junctures, as indicated at X and Y, following assembly and installation of operating parts. Casing section 12b comprises a wall or bulkhead 12d upon which operating parts are supported, and which serves to confine fluid the pressure-variations of which are to be sensed and indicated. The bulkhead divides the interior of the casing into first and second closed chambers. Sealed to a protruding end of a perforate boss 12e that is formed as a part of the bulkhead, is a perforate resilient diaphragm-disc 14a of a sealed pressure-sensitive cell 14. Attachment of disc 14a to boss 12e is preferably by brazing, in a manner known in the art, around the periphery of the perforation and boss. Cell 14 comprises a second, imperforate resilient diaphragm-disc 14b; and two discs of the cell are sealed together, as by heli-arc welding around the periphery of the cell. The cell, as indicated, is disposed in the space of chamber 14s between bulkhead 12d and base 12a, the proportions of the parts being such that excessive expansion of the cell is prevented by contact with base 12a. The casing (herein the base 12a) is provided with suitable means for introduction of fluid whose pressure is to be sensed, those means comprising a tapped opening 120 which communicates with chamber 14s by way of a small through-bore as indicated. Thus fluid under pressure is admitted into chamber 14s and becomes effective on the outer surfaces of cell 14, causing the cell to contract and the inner disc 14b to be displaced as the pressure increases and permitting expansion of the cell and opposite displacement of disc 14b as the pressure decreases. As is evident, contraction and/or expansion of the cell 14 results in changes in the volume of the cell and in movement of the central part of disc 14b, the movement being made substantially linear with changes of pressure of the surrounding fluid relative to that within the cell. Movement of the center portion of disc 14b is transmitted or translated through boss 12e of the bulkhead, by a stiff slender rod or strut 16 that is welded at its inner end to the center of the inner face of disc 14b as indicated in FIG. 1.

Figure 2:
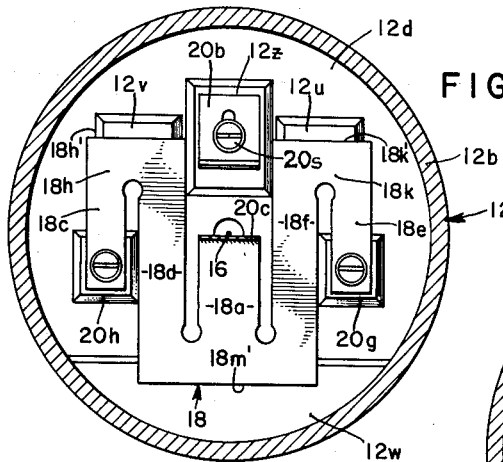
FIG. 2 is a sectional view of the instrument depicted in FIG. 1, taken along a plane indicated by line 22 of FIG. 1.
Figure 4:
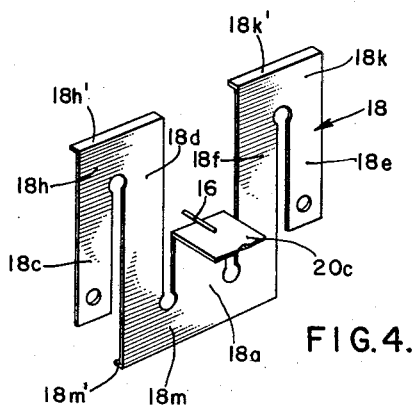
FIG. 4 is a view showing details of a spring-member comprised in the instrument depicted in FIG. 1, with fragments of attached parts secured to the spring-member and illustrating the connections to the spring-member.

Mounted on pedestals 20g and 20h that are formed as portions of bulkhead 12d, is a resilient means in the form of a shaped spring 18 (FIGS. 2 and 4). Spring 18 comprises a center arm 18a and opposed outer arms 18c and 18e each connected to a respective one of inner limbs 18d and 18f by upper bridges 18h and 18k respectively, and a lower bridge 18m that connects the inner limbs to arm 18a, all as indicated in FIG. 4. As there indicated, each of the bridges is provided with a flange, such as 18k' and 18m', for a purpose presently to be explained. The spring 18 is secured to pedestals 20h and 20g by suitable means such as welding, or, as shown, by screws turned into tapped holes in the pedestals and passing through appropriately positioned apertures in the lower end portions of outer arms 18c and 18e. Bulkhead 12d has integrally formed upper pedestals or abutments 12u and 12v (FIG. 2) and a lower abutment 12w, arranged as shown and provided with smooth planar faces opposite which respective ones of the flanges 18k', 18h' and 18m' are positioned. The arrangement is such that normally the edges of the flanges are always in contact with the associated abutments even with full contraction of the sensor 14, whereby the spring 18 is permitted free flexure but any appreciable vibration of which is immediately damped by contact of the abutments by the flanges.

Adjustably secured to an upper pedestal 12z formed on the bulkhead 12d, is a slotted bracket 20b which is held in adjusted position by fastening means comprising a screw 20s that is entered through a slot in the base of the bracket and turned up tight in a tapped hole provided in the pedestal, as indicated in FIGS. 1 and 2. Bracket 20b has firmly secured thereto the divergent end of an upper (as shown) resilient limb 20a of a motion-multiplier device 20, of which device the bracket is a part. The multiplier device comprises a lower resilient limb 20c, and interconnecting means in the form of a bridge means 20e which conveniently may be formed integral with the limbs 20a and 20c. Preferably the limbs of device 20 are formed as flat leaf-springs formed or arranged to be at least slightly divergent away from bridge 20e and having their convergent ends turned up at right angles to the interconnecting web forming bridge 20e. Thus the divergent end of upper limb 20a is adjustably affixed, through bracket 20b, to the relatively fixed structure formed by the bulkhead 12d and the remainder of casing 12.

The divergent end of lower limb 20c of the motion-multiplier is welded, preferably across its entire width, to the complementary upper edge of the upstanding arm 18a of spring 18, as indicated in FIG. 4. Thus the lower limb is supported by the spring 18 but is permitted longitudinal movement. The outer end portion of the aforementioned motion-transmitting rod or strut 16 is brazed or welded to the upper surface of lower limb 20c, as indicated in FIG. 4 and in FIG. 2 as well. As may be noted by examination of FIGS. 1 and 2, the motion-transmitting strut 16 extends through the opening or bore formed through boss 12e of the bulkhead.

Thus as cell 14 expands and contracts incident to decrease and increase of pressure exerted by the fluid in space 14s, wire 16 reciprocates or is displaced, transmitting the movement or displacement of disc 14b to the lower limb 20c of the motion-multiplying device 20. Due to the stationary mounting of the divergent end of upper limb 20a, movement to the right (as shown in FIG. 1) of the divergent end of lower limb 20c will cause flexure (bending) of both limbs and upward movement of bridge 20e of the device. As may be evident or verified by trial, the extent of movement of bridge 20e will be much greater than that of strut 16, and will be substantially a pivotal or rotational movement about an unfixed and slightly shifting center between the upper and lower limbs of device 20. The extent of the amplification of motion imparted to the divergent end of limb 20c, is dependent upon the effective length of limbs 20a and 20c, and upon the distance between them at their divergent ends. Thus the gross extent of multiplication of movement effected and required for a particular range of pressure-changes to be accommodated, may be governed by and accommodated in, the design of the lengths of the free (flexible) portions of limbs 20a and 20c. Also, precision adjustments of the multiplication ratio may be effected by adjustment of bracket 20b toward, or away from, limb 20c to appropriately vary the distance separating the anchored divergent ends of the limbs. As is evident, the extent of free length of the respective limbs may be controlled by controlling the length or extent of bridge 20e in the direction toward the divergent ends of the limbs, as well as by merely making the limbs longer or shorter, as required. Also, the effective ratio of multiplication is also dependent upon the length of an extension of bridge 20e (or an attachment thereto) in a direction away from the divergent ends, and so may be increased or lessened by proper selection of the length of the extension.

Figure 3:
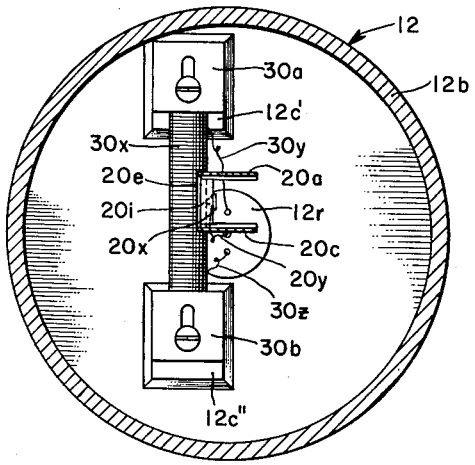
FIG. 3 is a sectional view of the instrument taken as indicated by line 3—3 of FIG. 1.

Suitably supported on and by the bridge end of device 20 for movement thereby, is a movable electric signaling means that in this embodiment of the invention is the wiper or contact element of a potentiometer. As shown, an insulative block 20i is affixed to bridge 20e, and supports an electrical wiper or contact 20x. As may be evident, the outer end of the latter will, in response to movements of wire 16, be moved along a substantially arcuate path of radius here arbitrarily represented as R, about an imaginary center c (FIG. 1). Disposed for cooperative functioning with contact 20x is a second electric signaling means or member comprising a resistance element 30x that may be of any suitable composition and is herein shown as of the wire-wound variety. Element 30x is appropriately of curved plan-form to accommodate the arcuate motions of contact 20x, and is mounted rigidly in insulative blocks 30a and 30b that are adjustably positioned and secured to respective pedestals 12c' and 12c" (FIGS. 1 and 3). Blocks 30a and 30b are provided with slot-apertures as indicated for accommodation of respective screws by means of which the blocks are clamped to the respective pedestals in an evident manner.

Electrical connections are provided for transmission of the pressure-representing signals from the signaling elements to another locality. The connections comprise insulated leads 20y, 30y and 30z, welded to contact 20x and to end portions of resistance element 30x, respectively, and terminated in a sealed quick-disconnect receptacle 12r in a manner known in the instruments arts. Thus, with electric potential applied across the terminals connected to respective conductors 30y and 30z, electric signals or indications in the form of potentials exhibited across the potentiometer are produced, the signals being representative of the differences between the variable pressures evidenced in the fluid around cell 14, and the pressure within the cell. As is evident, if the signals are to represent absolute pressure, the interior of the casing 12 is evacuated and sealed off in a manner known in the art;

and if gauge pressure is to be transduced, the ambient atmosphere is permitted access to the interior of the casing. The casing may be provided with suitable means permitting attachment to apparatus with which the transducer is to be used, and as herein shown, base 12a may be provided with tapped holes 12a" (FIG. 1) for that purpose.

The preceding description makes it evident that the present invention provides means for amplifying or multiplying movements of small magnitude, of disc 14b, the multiplication being to a predeterminable and adjustable extent and without lost-motion in the amplifying means. Further, it has been made evident that due to the absence of physical pivots, pinions, or pin-and-link connections, the disclosed device is not subject to rapid wear and loss of adjustment, is accurate, and may be inexpensively manufactured. It is further evident that each of the aforementioned objects of the invention has been fully attained. It is evident that in the light of the present disclosure, changes and modifications of the illustrated exemplary structures within the scope and spirit of the invention will occur to others, and accordingly it is not desired to limit the invention to the details of the illustrated exemplary structure, but we claim:

1. A pressure transducer comprising:
   first means, comprising casing means defining first and second chambers separated by a wall having an opening therethrough, and having provision for admitting fluid under pressure to said first chamber;
   second means, comprising a resilient expansible and contractible cell disposed in said first chamber and sealed against ingress of fluid admitted to said first chamber and having an opening aligned with the said opening in said wall; and
   third means, comprising displacement-translating means, disposed principally in said second chamber and extending through said opening and attached to an inner wall of said cell for actuation by the latter in response to expansion and contraction of the cell, said third means comprising means connected to said translating means for amplifying motions of said inner wall of said cell, and for producing electrical indications of the movements of said inner wall.

2. A pressure transducer according to claim 1, said means for amplifying motions comprising a first elongate spring limb connected at one end to said displacement-translating means for movement thereby, a bridge means to which the other end of said spring limb is connected, and a second elongate spring limb having one end secured to said bridge means and arranged in divergent relationship therefrom with respect to said first elongate spring limb, and the other end of said second elongate spring limb being attached to said first means to be held stationary thereby, whereby said bridge means is substantially arcuately moved a relatively large distance incident to displacement of said inner wall a relatively small distance; and said third means including as means for producing electrical indications, a potentiometer contact supported by said bridge means and a cooperating potentiometer resistance element supported by said first means.

3. A pressure transducer comprising:
   first means, comprising casing means providing an enclosed chamber having a wall having an opening therethrough and provision for admitting under pressure into the chamber;
   second means, comprising a sealed elastic cell having an aperture and sealed around said aperture to said casing wall around said opening, said cell having an inner surface opposite said opening and adapted to contract and expand with changes in pressure exerted by fluid in said chamber;
   third means, comprising a strut extending through said aperture and opening and secured at its inner end to said inner surface of said cell for longitudinal displacement with said inner surface incident to contraction and expansion of said cell, said third means including spring-device means constructed and arranged to accurately amplify displacements of said strut; and
   fourth means, comprising electrical indicator means including a movable element and a stationary element, constructed and arranged to produce electrical indications incident to movement of said movable element, said movable element being supported upon said spring-device means for movement thereby through the amplified displacements thereof.

4. A pressure transducer according to claim 3, said spring-device means comprising an arcuately movable bridge means and two elongate spring limbs each attached at one end to said bridge means and extending divergently away from the bridge means, the other end of the first of said spring limbs being secured to the outer end of said strut as an extension thereof and the other end of the second of said spring limbs being attached to and held stationary by said first means.

5. A pressure transducer according to claim 4, said spring-device means comprising a stabilizing spring attached at one end to the juncture of said strut and first spring limb and at another end to said first means, whereby said stabilizing spring restrains said strut from deviating from longitudinal motion.

6. A pressure transducer according to claim 5, said electrical indicator means comprising as said movable element the movable contact element of a potentiometer and comprising as said stationary element the resistance element of a potentiometer supported by said first means in cooperative engagement with said contact, whereby change of pressure of fluid in said chamber, as evidenced by displacements of the inner wall of said cell, are without lost-motion accurately and with improved resolution converted into electrical changes accurately representing the respective changes of pressure of the admitted fluid.

7. A pressure transducer comprising:
   first means, comprising relatively stationary means, defining a substantially closed chamber having first and second openings thereinto;
   second means, comprising a pressure-sensitive resilient cell having an interior wall and an opening communicating with said second opening of said first means, said cell being sealed to said first means around said communicating opening;
   third means, comprising a motion-multiplying device, and means connecting said device to said interior wall of said cell, for amplifying motions of said wall incident to change of volume of said cell incident to change in pressure exerted on said cell by fluid admitted into said chamber through said first opening; and
   fourth means, comprising electrical means, connected for actuation by said motion multiplying device, for providing electrical signals accurately representing changes in the pressure exerted by said fluid on said cell.

8. A pressure transducer comprising:
   first means, including casing means, providing a chamber having first and second openings, and means for admitting fluid under pressure into the chamber through a first of the openings;
   second means, comprising an elastic variable volume cell having an opening therein, said opening communicating directly with the second opening of said chamber and said second means comprising means sealing said cell in said chamber around the communicating openings to provide access to the interior of the cell from outside the chamber, said second means comprising a motion-transmitting strut extending from outside the chamber through said communicating openings into the interior of said cell and having its interior end secured to the wall of the cell for longitudinal translation incident to expansion and contraction of the cell;

third means, comprising resilient means attached to the exterior end portion of said strut, effective to amplify without lost motion the longitudinal translations of said strut; and fourth means, including electric signalling means, connected to said third means for actuation thereby, effective to produce electrical indications of motion of said resilient means, whereby said electrical indications are accurate representations of the movements of contraction and expansion of said cell incident to change of pressure exhibited by fluid admitted to said cell.

9. A pressure transducer comprising:

first means, comprising casing means providing an enclosed chamber with provision for admission of fluid under pressure into the chamber, and said casing means providing a wall for the chamber and an opening through the wall;

second means, comprising a variable-volume hollow elastic cell arranged in said chamber and having an aperture communicating with said opening and being sealed to said casing wall around said opening whereby to prevent escape therethrough of fluid from said chamber and to isolate the interior of the cell from fluid admitted to the chamber;

third means, comprising spring means, connected to an inside wall of said hollow cell opposite said opening and connected to said first means and constructed and arranged to amplify movements of said inside wall incident to change of volume of said cell due to change of pressure exerted on said cell by fluid admitted to said chamber; and fourth means, comprising electric means, connected to said third means for actuation thereby, for producing accurate electrical indications of movements of said inside wall relative to said casing means, whereby said electrical indications are accurate representations of changes of pressure exerted upon the exterior of said cell by fluid admitted to said chamber.

10. A pressure transducer comprising:

first means, comprising casing means, defining an enclosed chamber having a wall with an opening therethrough, and means for introducing fluid under pressure into the chamber;

second means, comprising a sealed variable-volume resilient cell in said chamber and having first and second opposed diaphragm discs the second one of which is provided with an aperture aligned with said opening and is sealed to said wall around said opening, and an elongate strut extending through said aperture and opening and secured to the inner wall of the first of said discs substantially at right angles thereto for longitudinal displacement incident to change of volume of the cell;

third means, comprising a displacement-amplifying device connected to said strut for amplifying displacements of the strut, said device comprising a first elongate leaf spring limb secured at a first end thereof to said strut for longitudinal displacement by the strut, a second elongate leaf spring limb secured at a first end thereof to said casing means, and a bridge means rigidly interconnecting and spacing the second ends of said spring limbs apart a distance less than that separating their first ends;

fourth means, comprising a stabilizing spring having outer limb ends and a middle limb end, and means securing said outer limb ends of said stabilizing spring to said first means and securing said middle limb end to said strut and said first elongate leaf spring limb to stabilize movements thereof; and fifth means, comprising a potentiometer contact supported and actuated by said bridge means and comprising a potentiometer resistance element supported by said first means in position to be brushed by said contact, whereby change of pressure exerted by fluid in said chamber on the exterior of said cell is accurately and with improved resolution translated into corresponding electrical indications by said contact and resistance element.

References Cited in the file of this patent

UNITED STATES PATENTS

| | | |
|---|---|---|
| 2,857,495 | Bourns et al. | Oct. 21, 1958 |
| 2,931,994 | Gibbs | Apr. 5, 1960 |